(12) United States Patent
Maguire

(10) Patent No.: US 8,061,143 B1
(45) Date of Patent: Nov. 22, 2011

(54) GAS TURBINE ENGINE REHEAT SYSTEMS

(75) Inventor: Addison Charles Maguire, Derby (GB)

(73) Assignee: Rolls-Royce Limited, London (GB)

( * ) Notice: Subject to any disclaimer, the term of this patent is extended or adjusted under 35 U.S.C. 154(b) by 0 days.

(21) Appl. No.: 05/886,070

(22) Filed: Mar. 2, 1978

(30) Foreign Application Priority Data

Mar. 5, 1977 (GB) .......................................... 9388/77

(51) Int. Cl.
F02K 3/10 (2006.01)
F02K 1/38 (2006.01)
F02K 1/46 (2006.01)

(52) U.S. Cl. ................ 60/765; 60/749; 60/266

(58) Field of Classification Search ............ 60/765, 60/761, 749, 262, 264, 266; 239/265.17, 239/265.19
See application file for complete search history.

(56) References Cited

U.S. PATENT DOCUMENTS 3,315,468 A * 4/1967 Vdoviak .......................... 60/749
3,595,024 A * 7/1971 Kohler et al. ............. 60/39.72 R
3,698,186 A * 10/1972 Beane et al. .................... 60/261

* cited by examiner

Primary Examiner — Timothy D Collins
Assistant Examiner — Joseph W Sanderson
(74) Attorney, Agent, or Firm — Oliff & Berridge, PLC

(57) ABSTRACT

A gas turbine reheat system is provided with channel-shaped gutters, with a wall portion spaced from each gutter to form a space therebetween. The space is supplied with cooling air conveniently from the engine by-pass duct.

4 Claims, 3 Drawing Sheets

GAS TURBINE ENGINE REHEAT SYSTEMS

This invention relates to gas turbine engine reheat systems.

It is usual in gas turbine engines which are intended for use in aircraft designed to fly at very high or supersonic speeds to provide means to significantly increase the thrust of the engine when such high or supersonic speeds are required.

This is normally achieved by augmenting the thrust of the engine with a reheat system. After the combustion gases are discharged from the gas turbine into the jet pipe of the engine, some additional thrust potential remains since not all of the available oxygen has been consumed. Since such a system uses an extra fairly large fuel flow, the system is not normally used continuously, but only for relatively brief periods of time so that considerable amounts of fuel need not be carried, and/or the range of the aircraft is not substantially reduced.

A typical reheat system consists of a series of annular channel-shaped gutters arranged at the upstream end of the jet pipe, and an array of fuel supply manifolds located immediately upstream of the gutters. The gutters serve to stabilize the flames formed in the jet pipe when the fuel flow is initiated and the resulting fuel/gas mixture ignited.

With more modern types of gas turbine engines however, the temperature of the gases entering the jet pipe can be very high, for example in excess of 1000° K, and it is increasingly more difficult to construct gutters which are capable of withstanding such tempertures.

It is an object of the present invention therefore to provide a gas turbine engine reheat system in which the gutters are capable of withstanding high temperatures.

According to the present invention a gas turbine engine reheat system has a gutter comprising a substantially channel-shaped flame stabilising portion, and a wall portion spaced from the flame stabilising portion to define a space therebetween, the space being adapted to be provided with a flow of cooling fluid, and exhaust duct means adapted to permit the escape of cooling fluid from the space.

Preferably exhaust duct means are located adjacent to at least one side of the stabilising portion.

The wall portion may also have a substantially channel-shape, the wall portion and the flame stabilising portion being secured together along the edges of the channels, orifices being provided along the secured edges to permit the escape of the cooling fluid from the space between the wall portion and the flame stabilising portion.

The space between the wall portion and the flame stabilising portion may consequently be supplied with a flow of cooling air along the length of the space. This flow of cooling air may conveniently be supplied from a by-pass duct incorporated in the engine.

Alternatively, the cooling air may be supplied to the space through a plurality of orifices in the wall portion, the gutter being arranged with the wall portion adjacent to duct means carrying a flow of cooling air.

The gutter may be annular or straight and be adapted to be mounted radially of the axis of the engine.

Embodiments of the invention will now be described by way of example only in which.

Figure 1:
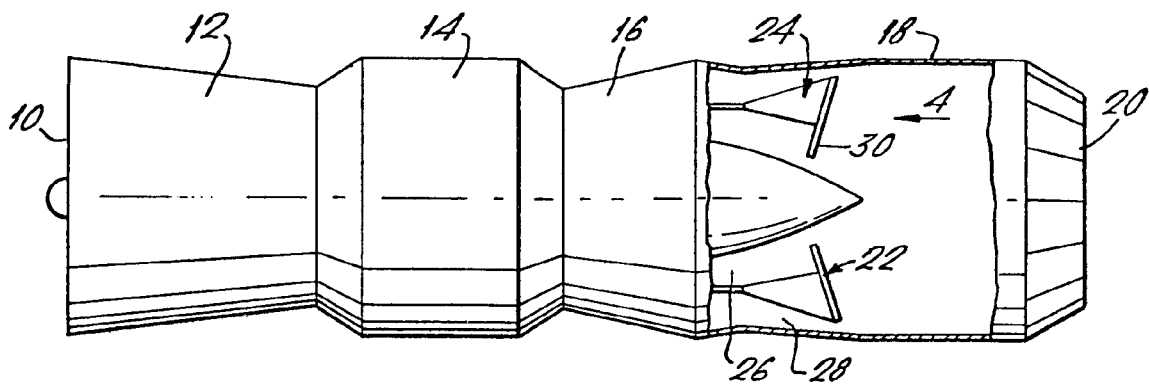
FIG. 1 is a schematic diagram of a gas turbine engine provided with a reheat system according to the invention.

In FIG. 1 there is shown a gas turbine engine comprising an air intake 10, a compressor 12, combustion equipment 14, a turbine 16, a jet pipe 18 and an exhaust nozzle 20.

Inside the jet pipe 18 is arranged a reheat system 22. The engine is of the by-pass type in which a portion of the air from the compressor by-passes the combustion equipment and the turbine, and rejoins the hot gases from the turbine in the jet pipe. To assist in the mixing of the gases, a mixer unit 24 is located in the jet pipe, and this consists of a plurality of lobes, alternate lobes being arranged to direct hot gases from the turbine exhaust duct 26 and cold air from the by-pass duct 28 into the jet pipe 18.

In a modern high performance gas turbine engine, the temperature of the turbine exhaust gases can be in excess of 1000° K and it is very difficult to provide a reheat system of gutters which can survive these temperatures.

In the present invention therefore a number of gutters 30 are arranged radially in the turbine exhaust gases of the engine and each consists of a channel-shaped flame stabilising portion 32 and a channel-shaped wall portion 34, the flame stabilising portion 32 being adapted to face downstream of the jet pipe. The portions 32 and 34 are secured together by suitable means along their downstream edges so as to leave orifices, such as narrow gaps or slots 36 along their secured edges. (See FIGS. 2 and 3)

These hollow gutters, when the engine is in use, have their interiors supplied with cooling air, conveniently from the by-pass duct, which can be deflected axially along each gutter by a suitable deflector member located at the radially outer end of each gutter.

The cooling air then passes out of the gutters in a downstream direction through the slots 36, this air also assisting in the promotion of vortices 38 adjacent to the flame stabilising portion 32 and improving the stability of the flame. Some of the cooling air also passes out of the open radially inner ends of the gutters 30.

Figure 6:
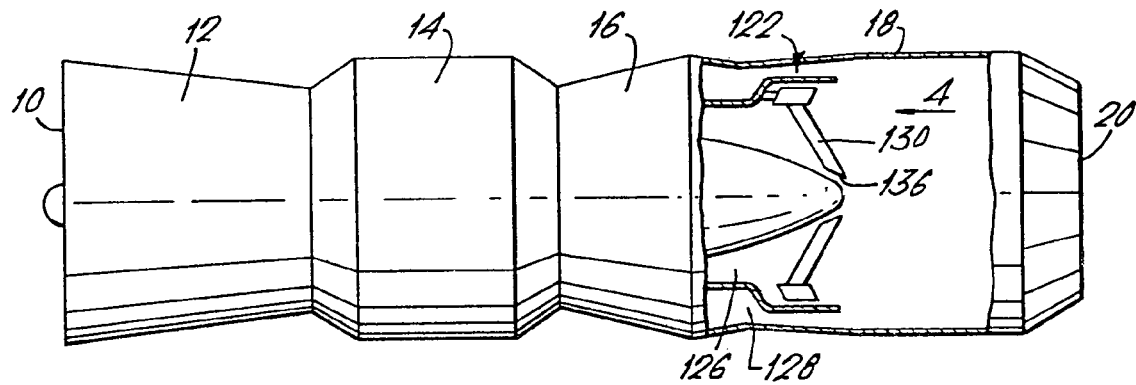
FIG. 6 is a schematic view of a gas turbine engine including a reheat system with slightly modified gutters.
Figure 7:
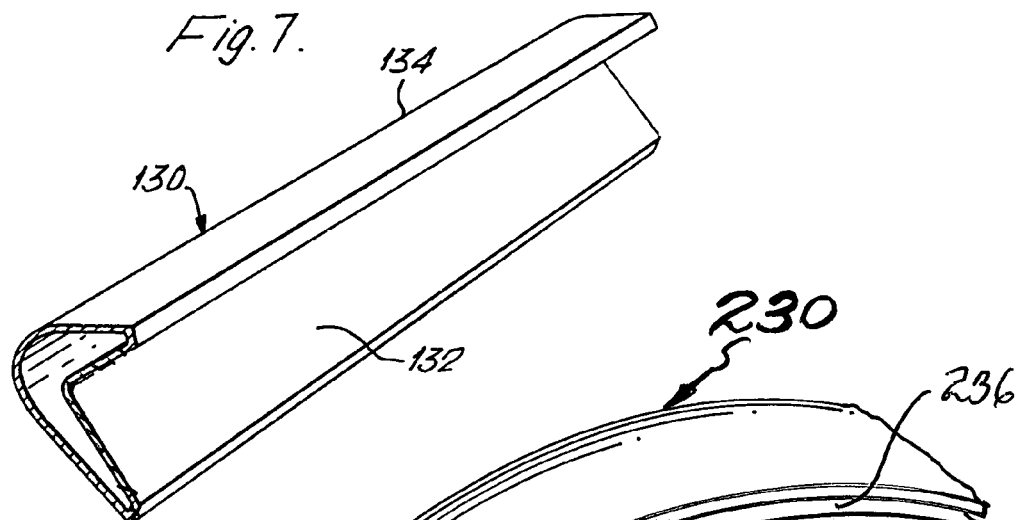
FIG. 7 is a fragmentary perspective view of one of the modified gutters of FIG. 6.

Alternatively the portions 32 and 34 are secured together by suitable means along the complete lengths of their downstream edges without the gaps or slots 36, as described below with respect to FIGS. 6 and 7. In this case, all of the cooling air passes out of the gutters from the open radially inner ends of the gutters 30.

Figure 2:
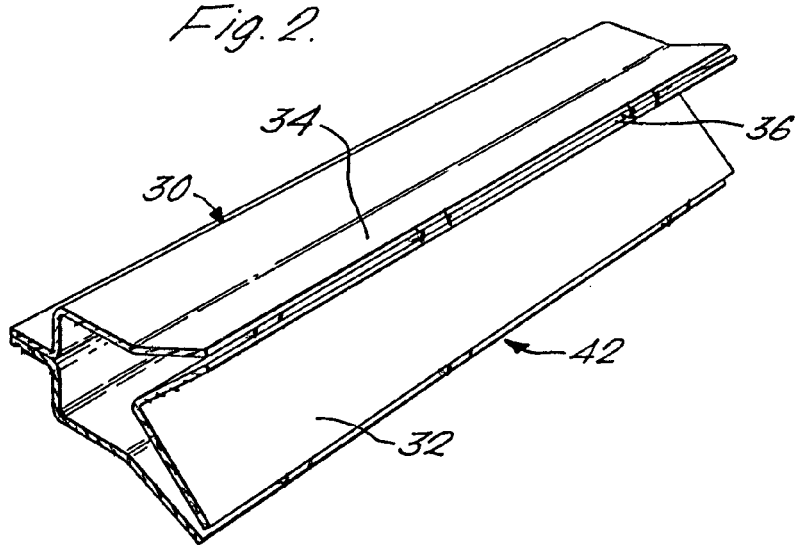
FIG. 2 is a perspective view of a portion of a gutter of the reheat system.
Figure 3:
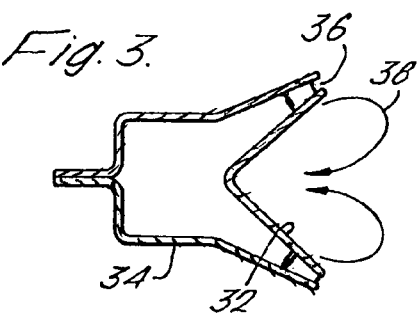
FIG. 3 is a cross-sectioned view of a portion of a gutter.

In the arrangement shown in FIGS. 1, 2 and 3, fuel is injected immediately upstream of the gutters 30 in the turbine exhaust gases, and upstream of the downstream end of the mixer at 24.

Figure 8:
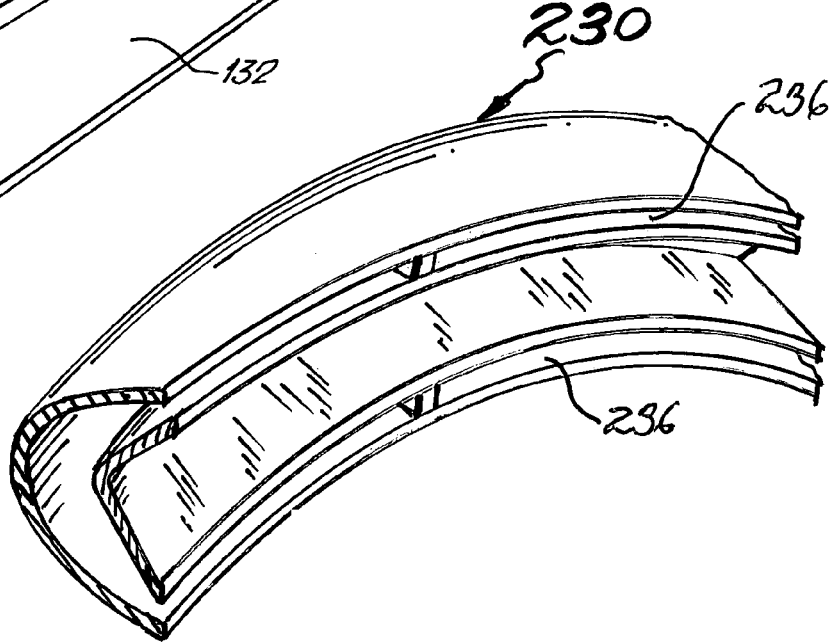
FIG. 8 is a fragmentary perspective view of an annular gutter incorporating the present invention.

The gutter 30 can be straight, as shown in FIG. 2 and extend purely radially of the engine into the lobes of the mixer unit 24 carrying the turbine exhaust gases. Also, as shown in FIGS. 6 and 7, the reheat system 122 may be positioned adjacent the downstream end of the turbine exhaust duct 126 and the by-pass duct 128, and include radially extending straight gutters 130, the gutters 130 not extending into lobes of a mixer unit. The gutters 130 each includes a channel-shaped wall 134 and a channel-shaped flame stabilizer 132 secured together along the edges of their lengths and open at their radially inner ends as shown at 136 in FIG. 6 for the discharge of cooling air. Alternatively as shown in FIG. 8, the gutters 230 may be mounted downstream of the mixer unit 24 and are of the more conventional annular shape concentric with the axis of the engine. Suitable, ducting (not shown) is arranged to supply the gutters 230 with cooling air, the cooling air escaping from the slots or orifices 236. The gutters 230 may be shaped in cross section like those of FIG. 3 or those of FIG. 7.

Figure 4:
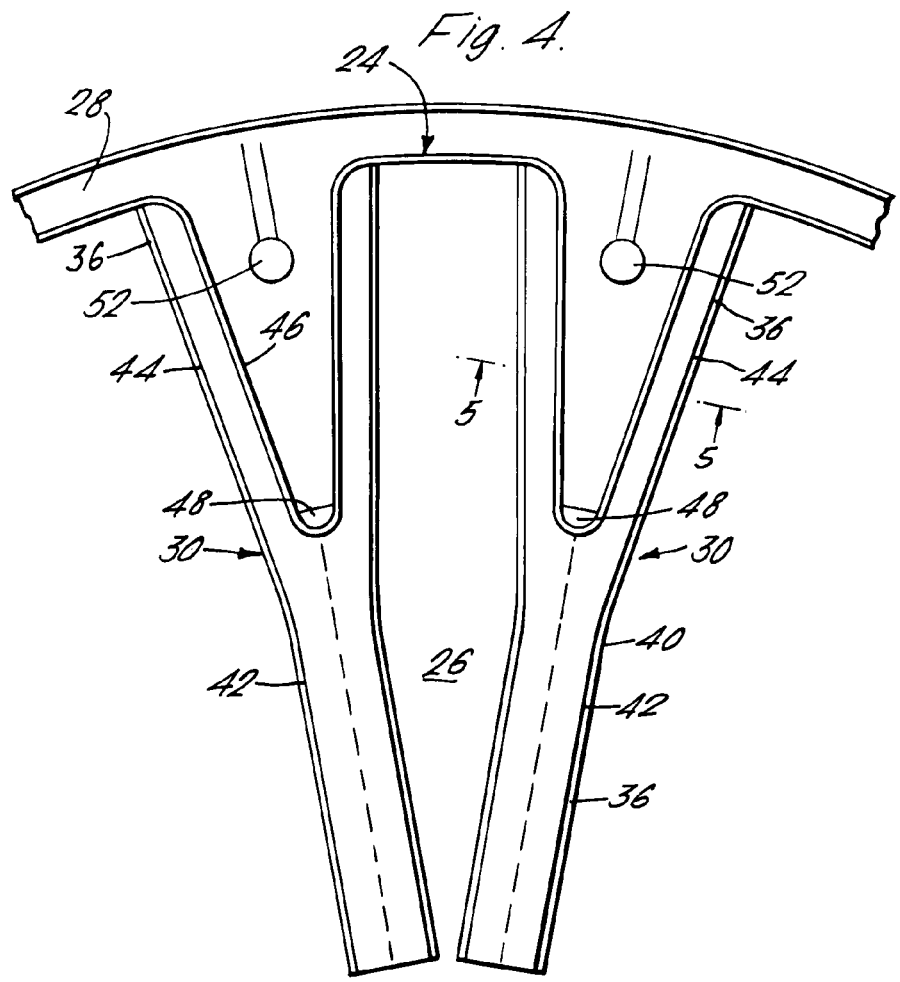
FIG. 4 is a view of the reheat system taken from arrow 4 in FIG. 1.
Figure 5:
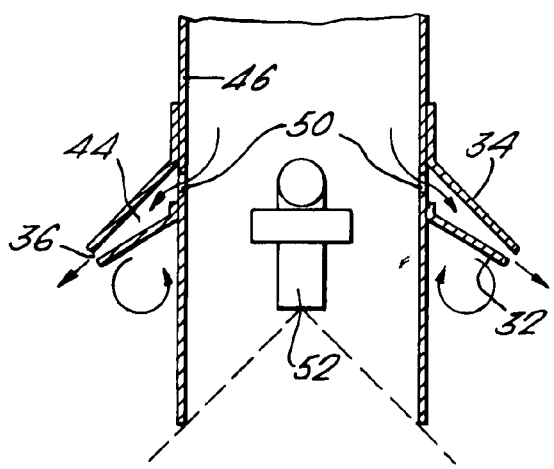
FIG. 5 is a view from line 5-5 in FIG. 4.

FIGS. 4 and 5 show gutters 40 which have a substantially Y-shape. These gutters again are arranged in the hot turbine exhaust gases, and the radially inner portions 42 are as shown in FIGS. 2 and 3. Their radially outer portions 44, however divide and are secured to the walls 46 of the lobes of the mixer unit 24. The radially inner portions 42 of the gutters are supplied with cooling air from the by-pass duct, deflectors 48 being arranged in the lobes to deflect air along the inner portions as before. The radially outer portions 44, however are supplied with cooling air through a plurality of holes formed in the walls 46 of the holes of the mixer unit 24. This air is discharged through the slots 36 as before, which continue along the length of each side of the gutter 40.

Each radially outer portion 44 is thus half the width of the radially inner portion 42 and only promotes a single vortex adjacent to the wall 46 of the lobe of the mixer unit 24.

The cooling air from the by-pass duct is substantially cooler than the turbine exhaust gases, typically less than 500° K, and thus can considerably reduce the temperature of the gutters.

I claim:

1. A gas turbine engine reheat system having a gutter, said gutter comprising a substantially channel-shaped flame stabilising portion and a substantially channel-shaped wall portion, said wall portion being spaced from said flame stabilising portion to define a space therebetween, said space being adapted to be provided with a flow of cooling fluid, said wall portion and said flame stabilising portion of said gutter having edges of their respective channels secured together, and exhaust duct means located adjacent to at least one side of said stabilising portion for permitting the escape of said cooling fluid from said space, said exhaust duct means including orifices provided along said secured edges to permit escape of said cooling fluid from said space, wherein said gas turbine engine is a by-pass type engine having a by-pass duct and said space is adapted to be supplied with a flow of cooling air along the axial length of said space from said by-pass duct.

2. A gas turbine engine reheat system as claimed in claim 1 wherein said gas turbine engine is a by-pass type engine and said cooling air is supplied to said space through a plurality of orifices formed in said wall portion, said gutter being arranged with said wall portion adjacent to said by-pass duct.

3. A gas turbine engine reheat system as claimed in claim 1 in which said gutter is annular in shape.

4. A gas turbine engine reheat system as claimed in claim 1 in which said gutter is straight and mounted radially of the axis of said engine.

* * * * *